Sheet 1 - 3 Sheets.

L. Underwood.
Hay-Raker & Loader.

N° 82770. Patented Oct. 6, 1868.

Witnesses.
E. Rose
H. R. Mixer

Lester Underwood

Sheet 2. 3 Sheets.

L. Underwood.
Hay Raker & Loader.
N° 82770.   Patented Oct. 6, 1868.

Witnesses: E. Rose, H. R. Miser

Lester Underwood

Sheet 3. 3 Sheets

L. Underwood.
Hay Raker & Loader
N° 82770  Patented Oct. 6, 1868.

Witnesses: E. Rose, H. R. Mixen

Lester Underwood

United States Patent Office.

LESTER UNDERWOOD, OF OTTAWA, ILLINOIS.

Letters Patent No. 82,770, dated October 6, 1868.

IMPROVEMENT IN HAY-RAKERS AND LOADERS.

*The Schedule referred to in these Letters Patent and making part of the same.*

TO ALL WHOM IT MAY CONCERN:

Be it known that I, LESTER UNDERWOOD, of Ottawa, in the county of La Salle, in the State of Illinois, have invented a new and improved Combined Hay-Raking and Hay-Loading Machine; and I do hereby declare that the following is a full and exact description thereof, reference being had to the accompanying drawings, and to the letters of reference marked thereon.

The nature of my invention consists in providing a horse-rake with teeth of an improved construction, to the effect that said teeth, when they meet an obstruction on the ground, such as a stone, which is often the case, the tooth meeting such an obstruction will, by contact with it, raise itself, and thus pass over, to fall in its original position afterwards.

My invention further consists in improving the ordinary hay-loader, in such a manner that it can be operated entirely from the wagon on which the hay is being loaded, the attendant never being required to come down for such purposes as disengaging the rakes, lifting the rakes, or unhitching the machine when the wagon is full, thus producing a saving of labor and time.

My invention further consists in providing a clevis, wherewith to hitch the machine to the wagon, in place of a chain, said clevis being bolted to the hind axle-tree of the wagon, without perforating or otherwise weakening the same.

My invention also consists in so constructing the hay-loader that, by removing the revolving teeth and the elevator, a simple horse-rake is obtained, to gather the hay in windrows on the field, if desired.

To enable others skilled in the art to make and use my invention, I will proceed to describe its construction and operation.

Figure 5:
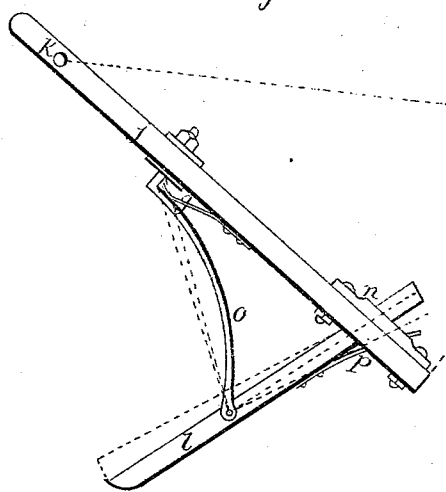
Figure 6:
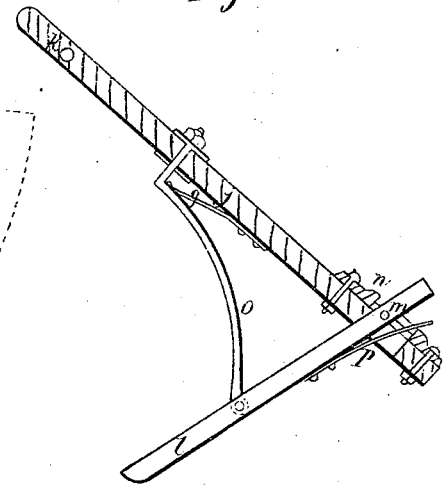

I construct a truck, A, on two wheels, in the ordinary form adopted for horse-rakes, while, also, I have the common form of elevator, B, attached to it, consisting of a framework, $a$, standards $b\ b$, revolving teeth $c$, endless slatted apron $d$, and chains $e\ e$, to transmit motion to the pulleys $ff$ from the wheels $g\ g$. Two adjustable standards, $h\ h$, have, at their lower ends, plates, with several holes, through which a pin or bolt fastens them to the truck A. Through the other end of said standards $h\ h$ passes a bolt, $i$, the whole breadth of the machine, and on this bolt $i$ are hung my improved rake-teeth, C C C, a separate plane view and section of which are shown in Figures 5 and 6. These teeth C C C are constructed of a piece of timber, $j$, figs. 5 and 6, having, at $k$, a hole, through which passes the bolt $i$, and on which the tooth swings up and down. A rail of hard wood, $l$, constituting the tooth proper, passes through a mortise in the end of the timber $j$. It is rounded at the lower end in such a manner that the foremost point is not the nearest to the earth, for the purpose of enabling the tooth to clear small obstructions with great ease. The rail $l$ has, at its upper end, a pin, $m$, which moves in a slotted cap, $n$. Towards the middle of the rail $l$ is adapted a rod or brace, $o$, which is hinged to the rail $l$ by one end, while the other end passes through the timber $j$, the hole being bushed with metal on both sides, to prevent rapid wearing of the hole. Two springs, $p$ and $q$, keep the tooth $l$ in its natural position as long as no obstruction is met, while, as soon as the tooth $l$ strikes an obstruction, one or more teeth become engaged, pushing the latter against the cross-bar $r$, which has, for effect, to depress the spring $p$, and to raise the lower end of the tooth $l$. If this should not be sufficient to clear the obstruction, the whole series of teeth will be raised by the cross-bar $r$, until the obstruction is passed over, when they fall back in their original position. If the obstruction is only a slight one, it will engage under the rounding part of the tooth $l$, and have, for effect, to depress the spring $q$, thus raising the tooth to a certain extent, and allowing it to fall back when the obstruction is passed.

It is seen that, by this arrangement, each tooth has an upward and downward motion, independent of the other teeth, thus enabling the rake to be used on unequal ground, each tooth remaining close to the soil.

The cross-bar $r$ is fastened to the beams $s\ s$, which swing on the bolt $i$, the upper and forward end sliding in a guide along the standards $b\ b$. These guides or standards $b\ b$ have a series of holes, through which pins are inserted, in order to adjust the position of the cross-bar $r$ in its relation to the teeth of the rake. The beams $s\,s$ are further provided with two sets of ropes, $t\,t$ and $u\,u$. The former pass around pulleys at the lower end of the standards $b\,b$, then up and through two rings fastened at the upper end of the elevator. When it is desired to pass over a certain piece of ground without gathering the hay from it, or to deposit the hay in windrows, the attendant on the wagon pulls said ropes $t\,t$, thus raising the teeth to any desired extent. The ropes $u\,u$ pass through rings at the upper end of the standards $b\,b$, and thence through rings at the upper end of the elevator. When it is desired to slightly raise the rake, on account of difference of ground, or for any other reason, the attendant pulls the ropes $u\,u$, and, by letting gently go, the braces $v\,v$ fall to the extent of a slot in their upper end, thus holding the rake in a more elevated position. The braces $v\,v$ have also, at their lower ends, a series of holes, in order to adjust the position of the rake before starting.

Figure 7:
Figure 8:
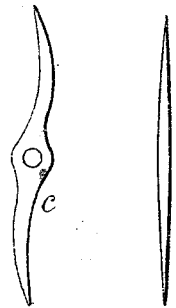
Figure 9:
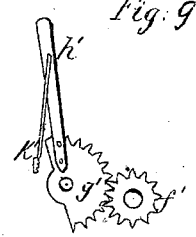

The two pulleys $f\,f$ are provided each with a ratchet and pawl, as shown in Figure 7, in order to enable the machine to rake and elevate the hay while turning a curve. At a distance about half between the wheels and the foremost end of the tongue $y$, I adapt a supporter, $z$, which, being adjustable, by having a series of holes through which to insert a pin, is very convenient to hold the machine in an upright position when not in use. This supporter $z$ is hinged to the tongue $y$, in order to enable it to give way before an obstruction, the spring $a^r$ pushing it forward again after the obstruction is passed.

At the forward end of the tongue $y$ is attached a loop, $b'$, which is also made adjustable by having in its central part a bolt, on which to swing up and down, while the back end can be fastened in either of two holes bored through the tongue $y$.

Figure 1:
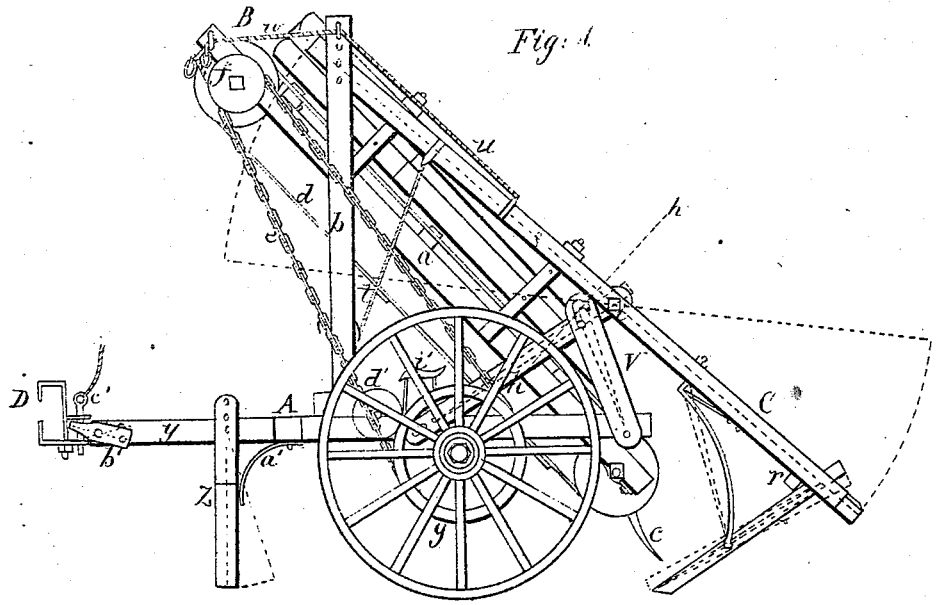
Figure 2:
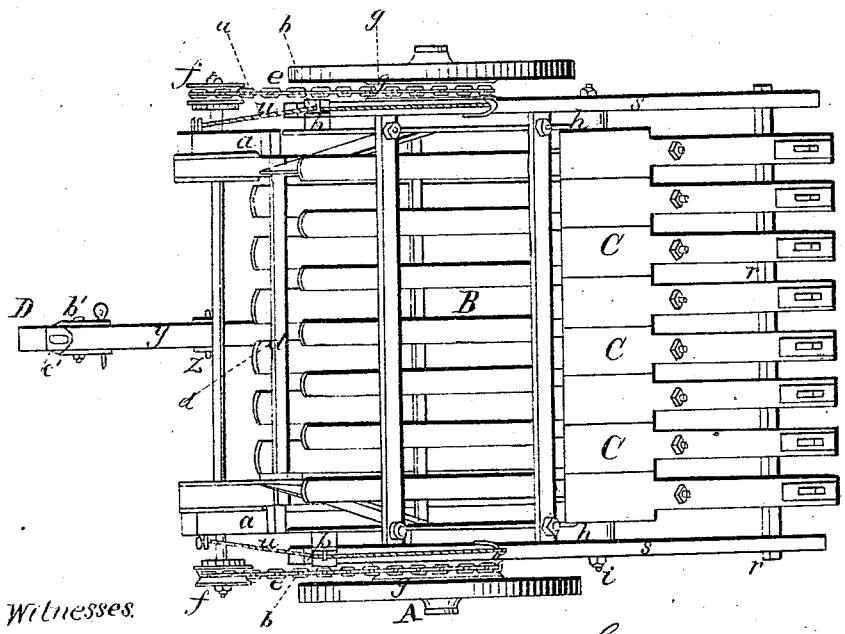
Figure 3:
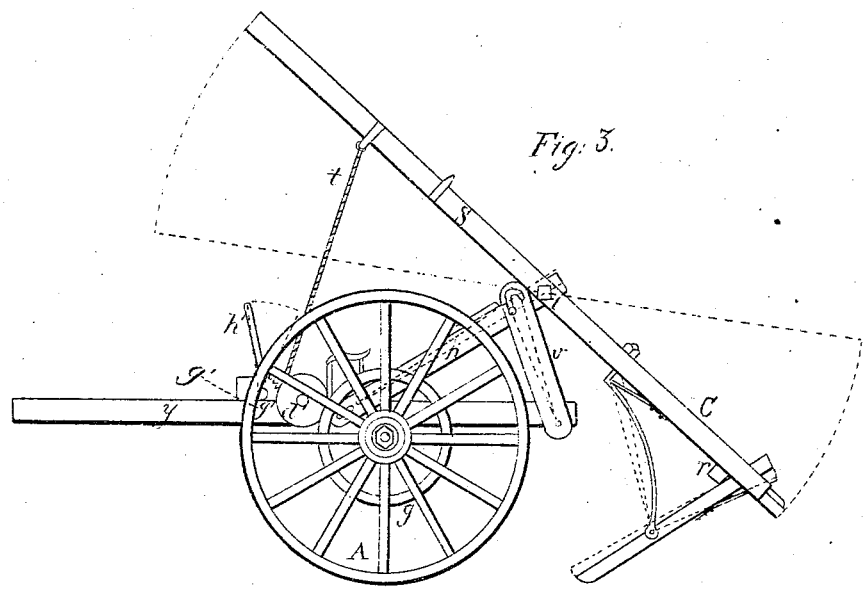
Figure 4:
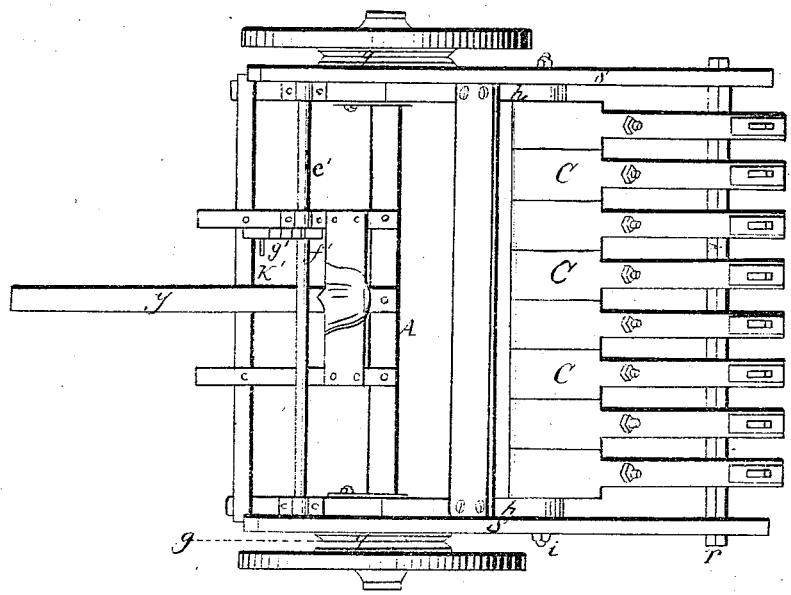

As a part of this machine, and to facilitate its use, I have invented the clevis D, clearly shown in Figures 1 and 2. This clevis is fastened to the hind axle-tree of a wagon, and the raking and loading-machine is coupled to it by means of a pin, $c'$, which passes through holes in the clevis D, and through the loop $b^4$, while, at the same time, a rope is fastened to the pin $c'$, in order to enable the attendant to pull out said pin $c'$ from the top of the wagon when full, leaving the machine stand on the field until his return with an empty wagon.

When it is desired to transform the machine into a simple horse-rake, the parts $a$, $b\,b$, $d$, $e\,e$, $f\,f$, constituting the elevating-apparatus, are removed. The ropes $t\,t$ are fastened to the grooved pulleys $d'$ on the shaft $e'$, said shaft $e'$ having keyed on it a toothed wheel, $f'$, which engages with a segment of a toothed wheel, $g'$, to which is attached the lever $h'$. The attendant, sitting on the seat $i'$, can, in this case, raise the teeth of the rake by pulling towards him the lever $h'$, which has, for effect, to rotate the shaft $e'$ and grooved pulleys $d'\,d'$, and, as the ropes $t\,t$ wind around the pulleys $d'\,d'$, the beams $s\,s$ are made to swing on the bolt $i$, and thus the teeth of the rake are raised to any desired extent, in order to deposit the hay in windrows. The same operation can be performed by the operator pressing the stirrup $k'$ with his foot, thus giving him the free use of both his hands.

What I claim as my invention, and desire to secure by Letters Patent, is—

1. The arrangement of the ropes $t\,t$ and $u\,u$, in combination with the standards $h\,h$ and braces $v\,v$, substantially as described, and for the purpose of enabling the machine to be used from the wagon.

2. The clevis D and pin $c'$, with rope attached, in combination with the loop $b'$, substantially as and for the purpose described.

3. The peculiar arrangement of the shaft $e'$, grooved pulleys $d'\,d'$, wheel $f'$, lever $h'$, and stirrup $k'$, in combination with the rakes C C C, substantially as and for the purpose described in the foregoing specification.

LESTER UNDERWOOD.

Witnesses:
E. ROSE,
H. R. MIXER.